(12) United States Patent
Kulprathipanja et al.

(10) Patent No.: US 8,789,338 B2
(45) Date of Patent: Jul. 29, 2014

(54) METHODS AND SYSTEMS FOR SEALING A WALL

(75) Inventors: Ames Kulprathipanja, Broomfield, CO (US); Ralph Michael Fay, Lakewood, CO (US)

(73) Assignee: Johns Manville, Denver, CO (US)

( * ) Notice: Subject to any disclaimer, the term of this patent is extended or adjusted under 35 U.S.C. 154(b) by 263 days.

(21) Appl. No.: 13/251,827

(22) Filed: Oct. 3, 2011

(65) Prior Publication Data

US 2013/0081346 A1    Apr. 4, 2013

(51) Int. Cl.
*E04B 1/00*     (2006.01)
*E04B 1/76*     (2006.01)

(52) U.S. Cl.
CPC ..................... *E04B 1/762* (2013.01); *E04B 1/7604* (2013.01)
USPC ...................... 52/742.13; 52/483.1

(58) Field of Classification Search
USPC ........... 52/480, 404.1, 404.3, 742.13, 745.09, 52/794.1, 745.13, 483.1
See application file for complete search history.

(56) References Cited

U.S. PATENT DOCUMENTS

| | | | |
|---|---|---|---|
| 2,885,008 A * | 5/1959 | Hoffer | 166/136 |
| 2,989,790 A * | 6/1961 | Brown | 52/742.13 |
| 3,559,890 A * | 2/1971 | Brooks et al. | 239/304 |
| 3,611,653 A * | 10/1971 | Zinn | 52/241 |
| 3,619,437 A * | 11/1971 | McDonald, Jr. | 264/46.6 |
| 3,621,624 A * | 11/1971 | Gustafsoon | 52/91.1 |
| 3,633,795 A * | 1/1972 | Brooks | 222/134 |
| 3,641,724 A * | 2/1972 | Palmer | 52/793.11 |
| 3,785,913 A * | 1/1974 | Hallamore | 428/71 |
| 3,962,120 A * | 6/1976 | Chiocchio et al. | 422/133 |
| 4,004,387 A * | 1/1977 | Ellingson | 52/309.3 |
| 4,112,646 A * | 9/1978 | Clelland | 52/372 |
| 4,134,242 A * | 1/1979 | Musz et al. | 52/309.1 |
| 4,177,618 A * | 12/1979 | Felter | 52/742.13 |
| 4,204,977 A * | 5/1980 | Zwirlein | 422/133 |
| 4,253,288 A * | 3/1981 | Chun | 52/454 |
| 4,259,028 A * | 3/1981 | Cook | 405/282 |
| 4,260,569 A * | 4/1981 | Hurst | 264/45.4 |
| 4,471,591 A * | 9/1984 | Jamison | 52/309.9 |
| 4,671,032 A * | 6/1987 | Reynolds | 52/210 |
| 4,712,347 A * | 12/1987 | Sperber | 52/404.1 |
| 4,829,738 A * | 5/1989 | Moss | 52/742.13 |
| 4,856,244 A * | 8/1989 | Clapp | 52/309.7 |
| 4,914,883 A * | 4/1990 | Wencley | 52/309.5 |
| 5,005,765 A * | 4/1991 | Kistner | 239/135 |
| 5,129,581 A * | 7/1992 | Braun et al. | 239/414 |
| 5,287,674 A * | 2/1994 | Sperber | 52/742.13 |
| 5,365,716 A * | 11/1994 | Munson | 52/742.13 |
| 5,389,167 A * | 2/1995 | Sperber | 156/71 |

(Continued)

*Primary Examiner* — William Gilbert
*Assistant Examiner* — James Ference
(74) *Attorney, Agent, or Firm* — Robert D. Touslee

(57) ABSTRACT

Embodiments of the invention provide apparatus and methods for insulating a structure. A method for insulating a structure may include providing a frame that comprises a plurality of frame members coupled together. Sheathing panels may be coupled to the frame members such that adjacent sheathing panels abut and directly contact each other at an interface to form a wall having a front surface and a rear surface. A spray insulation material may be applied to the front surface of the wall such that the insulation material forms a substantially continuous insulation layer atop the front surface and such that the insulation material directly contacts the interface between adjacent sheathing panels to restrict passage of air between the adjacent panels to at or below 0.2 L/m2/s at a differential pressure across the wall of 75 Pa.

18 Claims, 5 Drawing Sheets

(56) References Cited

U.S. PATENT DOCUMENTS

| | | | |
|---|---|---|---|
| 5,499,482 A * | 3/1996 | Goff | 52/742.13 |
| 5,526,957 A * | 6/1996 | Brown et al. | 222/94 |
| 5,641,368 A * | 6/1997 | Romes et al. | 156/71 |
| 5,655,350 A * | 8/1997 | Patton | 52/742.13 |
| 5,666,780 A * | 9/1997 | Romes et al. | 52/742.13 |
| 5,701,709 A * | 12/1997 | Dixon, III | 52/404.1 |
| 5,758,463 A * | 6/1998 | Mancini, Jr. | 52/309.12 |
| 5,765,330 A * | 6/1998 | Richard | 52/309.13 |
| 5,787,665 A * | 8/1998 | Carlin et al. | 52/309.4 |
| 5,842,276 A * | 12/1998 | Asher et al. | 29/897.32 |
| 5,921,055 A * | 7/1999 | Romes et al. | 52/742.13 |
| 5,953,883 A * | 9/1999 | Ojala | 52/794.1 |
| 6,012,263 A * | 1/2000 | Church et al. | 52/742.13 |
| 6,047,518 A * | 4/2000 | Lytle | 52/742.13 |
| 6,279,284 B1* | 8/2001 | Moras | 52/408 |
| 6,283,221 B2* | 9/2001 | Hurray et al. | 169/30 |
| 6,308,491 B1* | 10/2001 | Porter | 52/794.1 |
| 6,314,695 B1* | 11/2001 | Belleau | 52/309.17 |
| 6,332,304 B1* | 12/2001 | Fuhrman | 52/745.19 |
| 6,408,594 B1* | 6/2002 | Porter | 52/794.1 |
| 6,481,172 B1* | 11/2002 | Porter | 52/506.01 |
| 6,484,460 B2* | 11/2002 | VanHaitsma | 52/293.1 |
| 6,533,189 B2* | 3/2003 | Kott et al. | 239/8 |
| 6,695,224 B2* | 2/2004 | Hunter | 239/290 |
| 7,127,856 B2* | 10/2006 | Hagen et al. | 52/309.9 |
| 7,160,930 B2* | 1/2007 | Sparks et al. | 521/125 |
| 7,168,216 B2* | 1/2007 | Hagen, Jr. | 52/480 |
| 7,194,845 B2* | 3/2007 | Belleau | 52/745.09 |
| 7,252,868 B2* | 8/2007 | Suda et al. | 428/74 |
| 7,574,837 B2* | 8/2009 | Hagen et al. | 52/404.1 |
| 7,662,221 B2* | 2/2010 | Fay | 106/15.05 |
| 7,748,197 B2* | 7/2010 | Romes et al. | 52/794.1 |
| 7,770,691 B2* | 8/2010 | Schabel, Jr. | 181/259 |
| 2001/0004818 A1* | 6/2001 | VanHaitsma | 52/293.1 |
| 2004/0040241 A1* | 3/2004 | Grunst | 52/309.11 |
| 2005/0188649 A1* | 9/2005 | Hagen | 52/782.1 |
| 2006/0160911 A1* | 7/2006 | Zhu et al. | 521/131 |
| 2006/0192033 A1* | 8/2006 | Dansizen et al. | 239/414 |
| 2006/0260267 A1* | 11/2006 | Hagen et al. | 52/745.19 |
| 2006/0272280 A1* | 12/2006 | Romes et al. | 52/794.1 |
| 2007/0010592 A1* | 1/2007 | Bowman et al. | 521/131 |
| 2007/0074474 A1* | 4/2007 | Jannelle et al. | 52/309.4 |
| 2007/0227814 A1* | 10/2007 | Schabel, Jr. | 181/288 |
| 2007/0234649 A1* | 10/2007 | Near et al. | 52/73 |
| 2007/0290074 A9* | 12/2007 | Dansizen et al. | 239/414 |
| 2007/0294976 A1* | 12/2007 | Fay | 52/515 |
| 2008/0120932 A1* | 5/2008 | Paradis | 52/309.8 |
| 2008/0184642 A1* | 8/2008 | Sebastian et al. | 52/309.4 |
| 2009/0126312 A1* | 5/2009 | Raimondi et al. | 52/745.05 |
| 2009/0173025 A1* | 7/2009 | Fay et al. | 52/302.3 |
| 2009/0234072 A1* | 9/2009 | Nakagawa et al. | 525/100 |
| 2010/0325988 A1* | 12/2010 | Poston | 52/236.3 |
| 2011/0209734 A1* | 9/2011 | Cannady | 135/96 |
| 2011/0271638 A1* | 11/2011 | Tierney et al. | 52/745.05 |

* cited by examiner

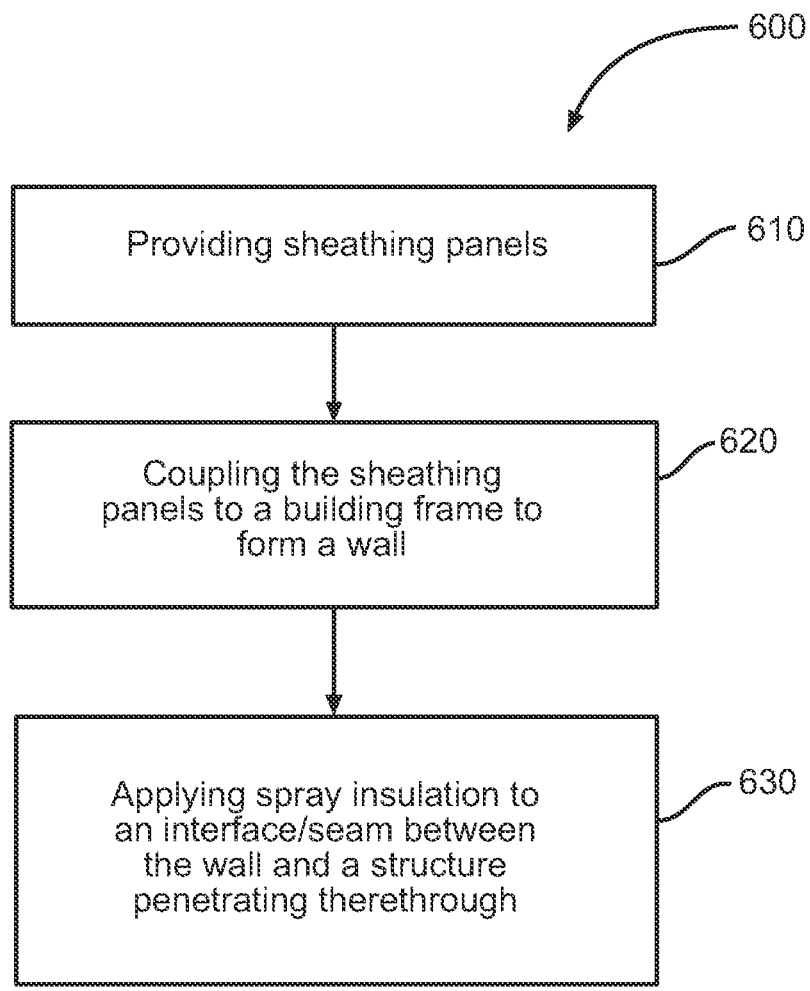

METHODS AND SYSTEMS FOR SEALING A WALL

BACKGROUND OF THE INVENTION

As building construction evolves, buildings are required to provide increased levels of insulation. Such increases in insulation help to decrease the energy requirements of the building while providing sufficient comfort to the building's occupants. To increase the thermal efficiency of a building, insulation is often applied to the outer and/or inner surfaces of the building. To further increase the thermal efficiency, air barriers are often applied, which minimize the exchange of air between the building's interior and the surrounding environment.

Traditionally, providing a building with both an air barrier and insulation requires a two step process. To provide the air barrier, an exterior wall surface is prepped to remove all dust and debris, then a primer is applied to seams in the exterior wall surface, and finally a tape material (e.g., flashing tape) is applied over the seams to seal any cracks, seams, or other openings. The surface prep and primer are typically necessary to ensure that the flashing tape sticks to the exterior wall surface. Often, the primer must completely dry before the tape material is applied and/or one or more coats of primer may be necessary to ensure that the tape adequately adheres to the exterior wall surface. This process is time consuming and expensive.

Subsequently, insulation may be applied over the taped exterior wall surface to provide an insulation layer. Such two step process adds cost and labor to building construction. Further, applying tape to the wall surface may provide a potential failure point at which cracks or seams may develop and thereby permit and/or increase air leakage. When multiple steps or redundancies are used to improve the process, more products are used that can lead to increased failure modes. As such, there is a need for improved methods of providing a building with both insulation and an air barrier assembly.

BRIEF SUMMARY OF THE INVENTION

Embodiments of the invention provide a continuous insulation layer for a building or structure, where the continuous insulation layer also functions as an air barrier assembly to reduce or eliminate air leakage through an exterior wall. The continuous insulation layer may be applied to a building or structure in a single step by applying an insulating material, such as a spray foam insulation, directly to an exterior wall of the building or structure. In other embodiments, the insulating material may be applied in a single step to ceiling, roofs, attics, and the like. The single step process described herein refers to the fact that other pre-spraying processes are not required, such as adding one or more coats of primer and/or flashing tape. In other words, the insulating material (e.g., spray foam insulation) may be applied directly to the exterior wall, seams between sheathing panels, seams between the sheathing panels and other features (e.g., vents, windows, roofing, pipes, etc.), structural edges, and the like. The continuous insulation layer may provide sufficient air barrier properties as defined by industry standard ASTM 2357 and also provide sufficient insulation properties.

According to one embodiment, a method for insulating a structure may include providing a frame that comprises a plurality of frame members coupled together and coupling sheathing panels to the frame members so that adjacent sheathing panels abut and directly contact each other at an interface. The coupled sheathing panels may form a wall having a front surface and a rear surface. The method may also include applying a spray insulation material (e.g., spray foam insulation) to the front surface of the wall so that the insulation material forms a substantially continuous insulation layer atop the front surface and so that the insulation material directly contacts the interface between adjacent sheathing panels. The continuous insulation layer and/or insulation material may restrict passage of air between the adjacent panels to at or below 0.2 L/m2/s at a differential pressure across the wall of 75 Pa. Likewise, the continuous insulation layer may provide an R value of at least 10. The insulation R value of 10 may correspond to an insulation layer thickness of about 2 inches.

The spray insulation material may restrict passage of air through the interface. One or more of the sheathing panels may abut a feature of the structure at an additional interface. The one or more features may include a pipe, a structural edge, a window, an aperture, a vent, a roof or roofing component, and the like. The spray insulation material may be applied atop the additional interface so that the spray insulation material directly contacts the additional interface to restrict passage of air therethrough. The spray insulation material may penetrate into the interface and/or additional interface. In some embodiments, the spray insulation may penetrate through the interface from the front surface to the rear surface. The insulation layer may seal the interface and/or additional interface to restrict passage of air therethrough.

In some embodiments, the insulation layer has a layer thickness of at least 2 inches. In other embodiments, the layer thickness may be in the range of about 1 inch to about 12 inches, and more commonly between about 2 inches and about 3 inches. In some embodiments, the method may further include preparing the front surface prior to applying the spray insulation material to remove debris, oil, machine oil, grease, mortar, oxidation, mill scale, dust, and the like. The spray insulation material may have adhesion promoters that enhance the ability to adhere to multiple substrates and/or to seal gaps or voids in interfaces and seams of adjacent sheathing panels and/or features (e.g., pipes, vents, and the like) penetrating through an exterior wall. Such enhanced adhesion is demonstrated by the tests described herein at different temperatures and pressure loadings.

The sheathing panels may include a fiberglass mat gypsum panel, an oriented strand board, and the like. The insulation layer may be capable of providing the R value of 10 and the air leakage rate of less than 0.2 L/m2/s at a differential pressure across the wall of 75 Pa after exposure to repeated cycles of hot and cold temperature. In other words, the insulation layer may be durable so that after a prolonged amount of time and/or usage the insulation and air barrier properties are not degraded below an industry standard. The spray insulation material may include a zero ozone depletion potential blowing agent.

According to another embodiment, a method for providing an insulating air barrier assembly to an exterior surface of a structure may include providing a plurality of sheathing panels and coupling the sheathing panels with a frame so that adjacent sheathing panels abut at a seam. The coupled sheathing panels may form a wall of the structure having an exterior surface and an interior surface. The method may also include applying a spray insulation material to the exterior surface of the wall. The insulation material may form an insulation layer atop the exterior surface and may directly contact at least one seam to restrict air flow between adjacent sheathing panels. The applied insulation material, may provide a thermal resistance R value of at least 10.

According to another embodiment, a structure having an insulated exterior surface may include a frame comprising a plurality of frame members coupled together and a plurality of sheathing panels coupled to the frame members so that adjacent sheathing panels abut and directly contact each other at an interface. The coupled sheathing panels may form a wall having a front surface and a rear surface. The structure may also include a substantially continuous insulation layer atop the front surface. The insulation layer may comprise a spray insulation material and may directly contact at least one interface between adjacent sheathing panels to restrict passage of air between the adjacent sheathing panels to at or below 0.2 L/m2/s at a differential pressure of 75 Pa across the wall. The insulation layer may also provide an insulating R value of at least 10.

The structure may further include an exterior material positioned atop the insulation layer, which may include: brick, siding, stucco, wood, an exterior insulation and finish system (EIFS), exterior cladding, and the like. In some embodiments, the insulation layer may have a layer thickness of at least 2 inches. In other embodiments, the layer thickness may range between 1 inch and 12 inches, and more commonly between 2 inches and 3 inches. The interface may include a gap or void of up to about ½-⅝ inch, and more commonly about ⅜ inch, and the spray insulation material may seal the gap or void to restrict passage of air therethrough.

BRIEF DESCRIPTION OF THE DRAWINGS

The present disclosure is described in conjunction with the appended figures:

FIG. 6 illustrates a block diagram of a method for providing an insulating air barrier to an exterior surface according to an embodiment of the present invention.

Figure 1:
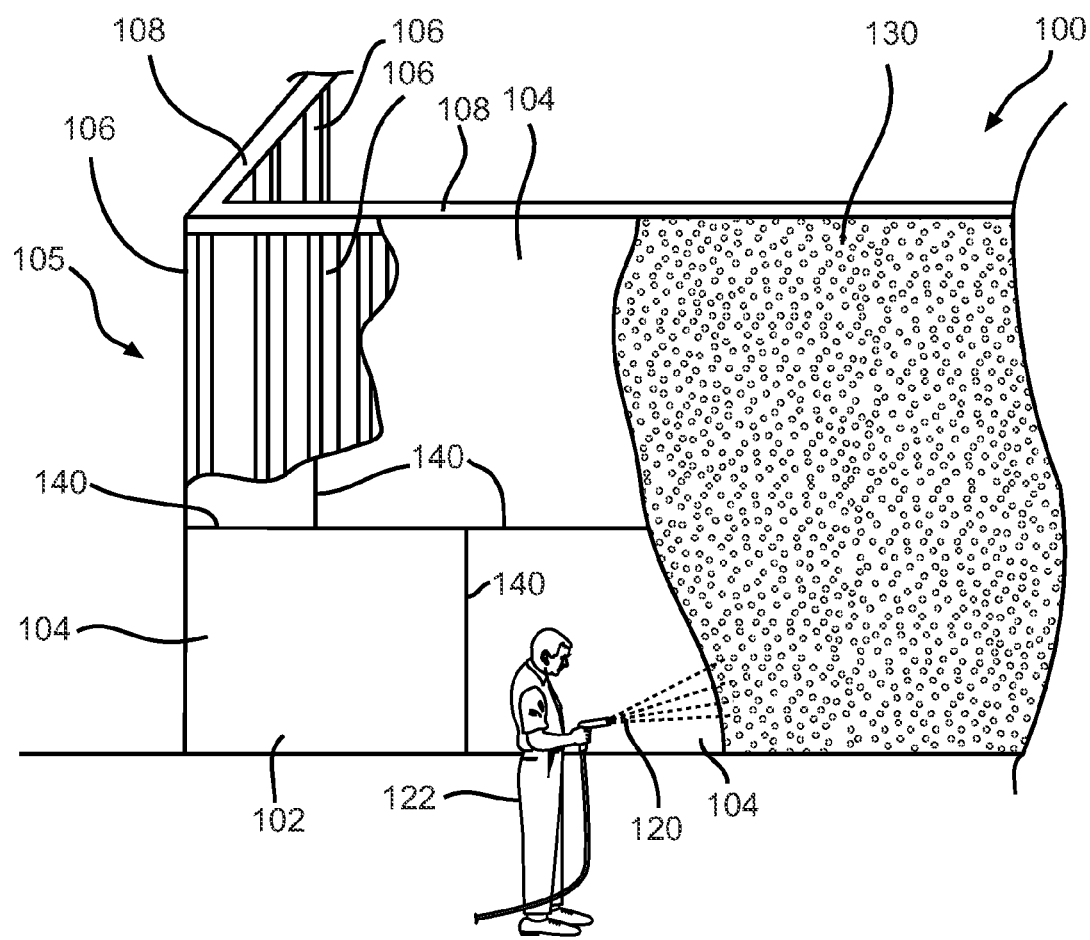
FIG. 1 illustrates an exterior surface of a building having insulation sprayed or applied directly onto the exterior surface according to an embodiment of the present invention.

In the appended figures, similar components and/or features may have the same reference label. Where the reference label is used in the specification, the description is applicable to any one of the similar components having the same reference label.

DETAILED DESCRIPTION OF THE INVENTION

Embodiments of the invention provide novel methods and system for providing insulation and an air barrier assembly to exterior surfaces of a building in a single step. The single step process described herein refers to the fact that one or more pre-spraying processes are not required, such as adding one or more coats of primer and/or flashing tape. In other words, the insulating material (e.g., spray foam insulation) may be applied directly to the exterior wall without requiring the application of a primer and/or tape material. The single step application of an insulating material that also provides an air barrier decreases the time and cost associated with insulating buildings. For example, less materials are required to insulate a building since primer and/or flashing tape is not needed. Further, the time and cost associated with installing the flashing tape and primer is eliminated. In some embodiments all that is required prior to applying the insulating material is minimal surface preparation to remove dust, debris, oil, metal or wood shavings, and the like.

The insulating material may be applied directly to the exterior surface of a building, such as exterior sheathing panels, and may be applied directly to seams or interfaces between adjacent sheathing panels. In some embodiments, the sheathing panels of the building include a fiberglass mat gypsum panel, oriented strand board, and the like. The insulating material may also be applied directly to seams or interfaces adjacent objects or features that protrude through the sheathing panels and/or are adjacent to the sheathing panels. Such objects or features may include: piping, windows, apertures, vents, roofs, edges, and the like. In some embodiments, the insulating material is a foam insulating material, which is applied by spraying the insulating material directly onto the exterior surface. The insulating material may provide a continuous insulating layer surrounding a portion, or the entire, exterior surface of the building.

The insulating material may penetrate into the seams and/or interfaces between adjacent sheathing panels and/or other features and seal the seams and/or interfaces to provide an air tight barrier. In some embodiments, the insulating material may penetrate through the building's wall from an exterior surface to an interior surface. The insulating material may seal the seams and/or interfaces to provide an air leakage rate at or below 0.2 L/m2/s at a differential pressure across the wall of 75 Pa. The insulating material may also provide an R value of at least 10. The insulating layer may provide an R value of 10 and/or the above defined air leakage rate after repeated exposure to cycles of hot and cold temperatures and/or varying air pressures. In other words, an insulated wall may be exposed to varying and cyclical air pressure differentials across the wall and/or may be exposed to varying and cyclical temperatures without the insulating and air barrier properties of the insulation layer degrading below an industry standard. Such cyclical temperatures and/or air pressure differentials are commonly applied in laboratory facilities that test exterior wall insulation layers. As described herein, a wall insulated according to the methods described herein was subjected to such testing and determined to meet or exceed such industry standards. The insulating material provides sufficient air barrier properties as defined by industry standard ASTM 2357 and provide sufficient insulation properties.

In some embodiments, the insulating layer atop the building's exterior surface may have a layer thickness of 2 inches or more. The spray insulation material may have adhesion promoters that enhance the ability to adhere to multiple substrates and/or seal gaps or voids in interfaces and seams of adjacent sheathing panels and/or features penetrating through the exterior surface. The spray insulation material may include a zero ozone depletion potential blowing agent. Exterior materials, such as brick, siding, stucco, wood, exterior insulation and finish system (EIFS), exterior cladding, and the like may be applied atop the insulating layer. In some embodiments, the gaps or voids that the insulating material may penetrate and seal may be up to about ½ inch or more and more commonly about ⅜ inch. Having briefly described embodiments of the invention, additional aspects of the invention will be realized with reference to the figures.

Insulated Air Barrier Assemblies

FIG. 1 illustrates an exterior surface or wall 102 of a building 100 having insulation 130 sprayed or applied directly onto the exterior surface or wall 102. Exterior surface or wall 102 includes a frame 105 that includes a plurality of vertical studs or posts 106 and a plurality of top plates or beams 108. The frame defines an interior and exterior of the building 100. In some embodiments, studs 106 and/or beams 108 comprise wood boards, metal posts, or a combination thereof of various size (e.g., 2×4 and the like). Applied to studs 106 and/or beams 108 on the exterior side of building 100 is a plurality of sheathing panels 104, which may include a fiberglass mat gypsum panel (e.g., DensGlass Flashing®), oriented strand board, and the like. Sheathing panels 104 are applied so that adjacent panels abut one another and form an exterior wall of building 100. Adjacent sheathing panels 104 abut at seams or interfaces 140. Sheathing panels 104 may be applied or coupled with frame 105 via nails, screws, adhesives, or a combination thereof. FIG. 1 illustrates a portion of sheathing panels 104 cut away to reveal frame 105 underneath. Seams or interfaces 140 may include gaps or voids (not shown) between adjacent sheathing panels and/or other objects. The gaps or voids may be up to about ⅝ inch, and more commonly about ⅜ inch.

Sheathing panels 104 may be applied around the entire perimeter of building 100 or a portion thereof. Insulation material 130 is applied directly atop sheathing panels 104 and seams or interfaces 140 to form a continuous insulation layer atop exterior surface or wall 102. As shown in FIG. 1, insulation material 130 may be applied via worker 122 spraying insulation material 130 directly onto sheathing panels 104 and/or seams or interfaces 140. Insulation material 130 is sprayed via spray insulation machine 120. As described herein, a continuous insulation layer, or continuous insulation, may refer to an insulating layer that runs or extends continuously over structural members (i.e., without substantial seams or gaps). Such a layer may help prevent or eliminate thermal bridging and improve the thermal efficiency of a structure.

In some embodiments, spray insulation material 130 comprises a 2 component closed cell polyurethane foam, such as a closed cell medium density (e.g., 2 pcf) spray foam insulation. Spray insulation material 130 may have an R value minimum of R 6 per inch, a smoke development not greater than 450, and flame spread not greater than 25 when tested in accordance with ASTM E 84. Further, spray insulation material 130 may include a zero ozone depletion potential blowing agent. In some embodiments, spray insulation material 130 may be generated at a job site by combining an isocyanate and a polymeric resin through a dual component proportioner. Spray insulation material 130 may be sprayed onto a surface via a dual component, volumetric, positive displacement pump, which combines the isocyanate and polymeric resin in a one to one volumetric ratio, although other volumetric ratios are possible. The blowing agent may be designed to remain trapped within the sprayed insulation material 130 subsequent the spray application to reduce energy consumption and/or $CO_2$ emissions. An example of a suitable blowing agent is 1,1,1,3,3-Pentafluoropropane (also known as HFC-245fa or R-245fa) manufactured by Honeywell® and sold under the name Enovate®. An example of a suitable spray insulation material 130 is Corbond III spray insulation foam marketed by Johns Manville.

Spray insulation material 130 seals seams and/or interfaces 140 to provide an air leakage rate at or below 0.2 L/m2/s at a differential pressure across the wall of 75 Pa—the air leakage rate defined by ASTM 2357. Spray insulation material 130 also provides an R value of at least 10 at an insulation layer thickness of approximately 2 inches. In other embodiments, spray insulation material 130 provides an R value of at least 12 at a layer thickness of approximately 2 inches.

Spray insulation material 130 is applied directly to seams or interfaces 140 without requiring the application of flashing tape and/or primer to seams or interfaces 140. Potential failure points are eliminated since flashing tape and/or primer is eliminated. For example, failure points may develop due to the use of primer and/or flashing tapes as the tape deteriorates and/or begins to peel away from the exterior wall surface. This potential problem is increased in areas that are difficult to tape, such as corners, edges, circular features, and the like, or in areas that are exposed to environmental elements. Further, the incorrect application of primer and/or flashing tape can result in increased air leakage and decreased thermal efficiency of a building or structure.

Spray insulation material 130 may be applied (i.e., sprayed) around a portion of the exterior surface of building 100, or applied around the entire perimeter, to provide a continuous insulation layer around the sprayed portion of building 100. The spray insulation material may have adhesion promoters that enhance the ability to adhere to multiple substrates and/or seal gaps or voids in interfaces and seams of adjacent sheathing panels and/or features penetrating through the exterior surface. Additional exterior materials (not shown), such as brick, siding, stucco, wood, exterior insulation and finish system (EIFS), exterior cladding, and the like may be applied over the continuous insulation layer of spray insulation material 130.

Figure 2:
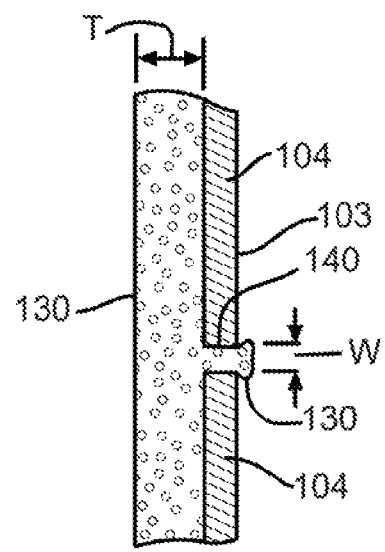
FIG. 2 illustrates a cross section of an exterior surface of a building having insulation sprayed or applied directly onto the exterior surface according to an embodiment of the present invention.

FIG. 2 illustrates the spray foam insulation material 130 applied directly atop adjacent sheathing panels 104 and applied directly to seam or interface 140. As shown in FIG. 2, spray foam insulation material 130 penetrates into and/or through seam or interface 140 between adjacent sheathing panels 104. Spray foam insulation material 130 may extend beyond an interior surface 103 of sheathing panels 104. Spray foam insulation material 130 seals seam or interface 140 to prevent or eliminate air passage therethrough. As such, spray insulation material 130, and the continuous insulation layer, provides an air barrier for building 100 in addition to insulating building 100. The insulation layer of spray insulation material 130 has a thickness T, which in some embodiments is between about 1 inch and about 12 inches, and more commonly between about 2-3 inches. A gap or width W of seam or interface 140 may be about ⅝ inch, and more commonly about ⅜ inch. Spray foam insulation material 130 penetrates and seals such gaps to prevent or eliminate air passage therethrough.

Figure 3:
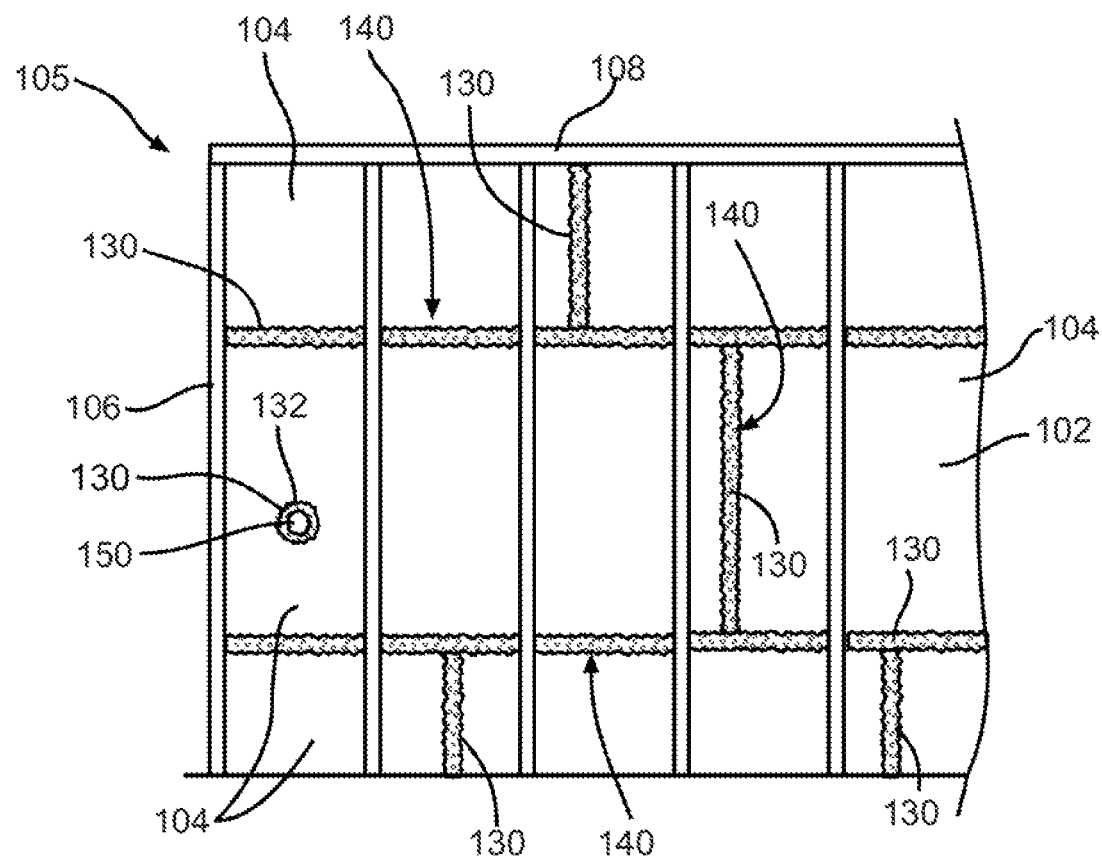
FIG. 3 illustrates the surface of FIG. 1 viewed from the building's interior according to an embodiment of the present invention.

FIG. 3 illustrates a view of the wall 102 from an interior space of building 100. Studs 106 and beams 108 of frame 105 are visible. A plurality of sheathing panels 104 are coupled to studs 106 and/or beams 108. Adjacent sheathing panels 104 abut at seams or interface 140. A spray foam insulation material 130 is applied to the exterior surface of wall 102. Spray foam insulation material 130 penetrates through the seams or interfaces 140 so that the spray foam material is visible on an interior surface, or from an interior side, of wall 102. Spray foam insulation material 130 may substantially penetrate through all or most of seams or interfaces 140 and effectively seal all or most seams or interfaces 140.

Spray insulation material 130 may also be applied directly to an additional seam or interface 132 adjacent an additional feature 150 that penetrates or extends through wall 102. Such additional features may include a pipe, a window, an aperture, a vent, an edge, a roof or roofing feature, and the like. Spray insulation material 130 may penetrate through additional seam or interface 132 to seal additional seam or interface 132 and provide an air barrier, or in other words, reduce or eliminate passage of air through additional seam or interface 132.

Figure 4A:
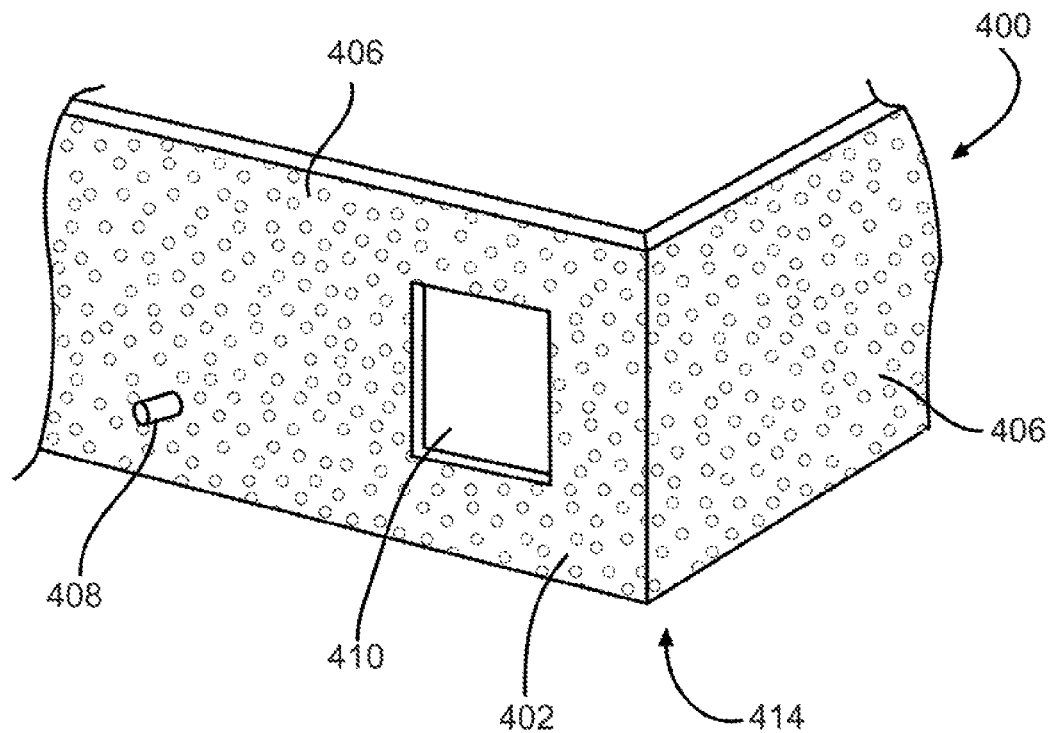
FIGS. 4A & 4B illustrate a portion of a building's exterior having insulation sprayed or applied directly to the exterior surface according to an embodiment of the present invention.
Figure 4B:
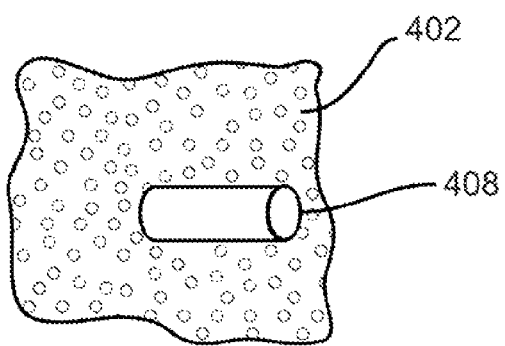

FIGS. 4A & 4B illustrate a perspective view of building 400 having a continuous insulation layer 406 atop an exterior surface 402. Continuous insulation layer 406 functions to both insulate building 400 and provide an air barrier to prevent passage of air through exterior surface 402. Continuous insulation layer 406 comprises a spray foam insulation material, such as those described herein, which is applied directly to exterior surface 402 and one or more seams or interfaces (not shown). Spray foam insulation material penetrates into and/or through the seams or interface to effectively seal the seams or interfaces. Spray foam insulation material is also applied directly to features of structures penetrating through exterior surface 402, such as pipe or vent 408, and to other features having a seam or interface with exterior surface 402, such as edge 414, seams or interfaces adjacent window 410, at an interface of exterior surface 402 and a roof (not shown), and the like. FIG. 4B illustrates an expanded view of a feature 408, such as a pipe or vent, penetrating through exterior surface 402. The spray foam insulation is directly applied to an interface between feature 408 and exterior surface 402. Spray foam insulation material effectively seals the seams, gaps, or voids associated with or adjacent such features to provide a continuous air barrier. The seams, gaps, or voids may be up to about ⅝ inch wide, and more commonly about ⅜ inch wide.

In some embodiments, continuous insulation layer 406 provides an R value of at least 10. In other embodiments, continuous insulation layer 406 provides an R value of between about 10 and about 30. In some embodiments, continuous insulation layer 406 may have a layer thickness of between 1 and 5 inches. In other embodiments, continuous insulation layer 406 has a layer thickness of between 2 and 3 inches. In some embodiments, continuous insulation layer 406 seals the seams and/or interfaces to provide an air leakage rate at or below 0.2 L/m2/s at a differential pressure across the wall of 75 Pa. Continuous insulation layer 406 may provide an R value of approximately 6 to 7 per inch of layer thickness so as to provide an R value of at least 10 or 12 at a layer thickness of approximately 2 inches.

It should be realized that although embodiments described herein generally refer to wall surfaces, the spray insulation material and continuous insulation layer may similarly be applied to ceiling surfaces, attics, roofs, and the like.

Method of Insulating Structures

Figure 5:
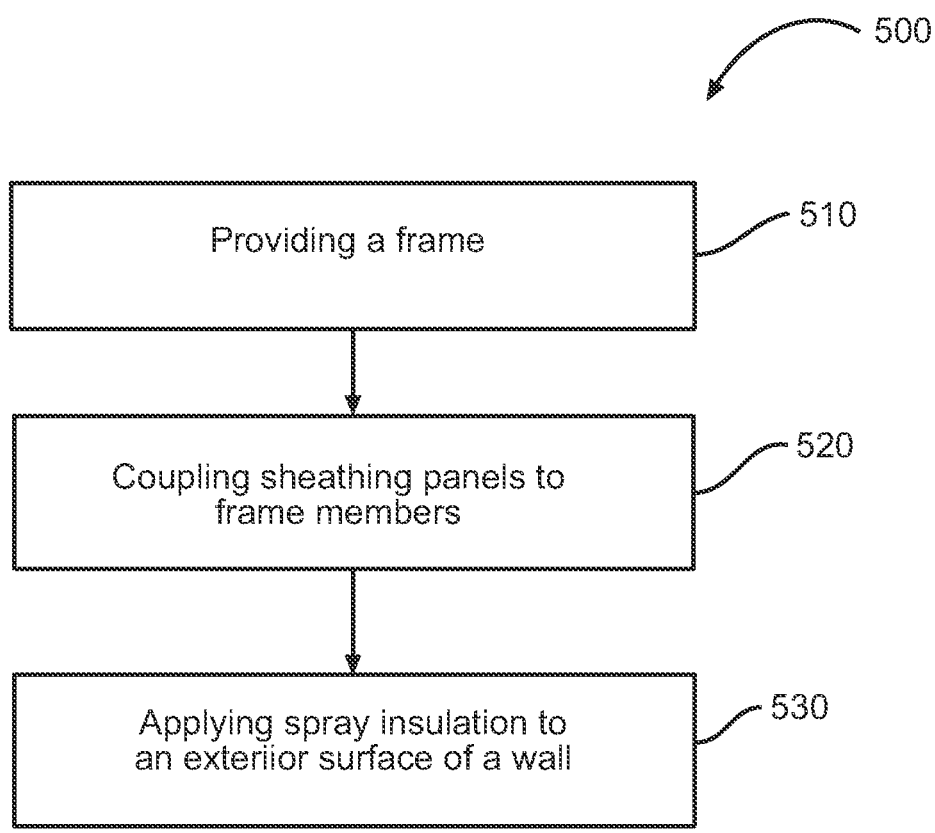
FIG. 5 illustrates a block diagram of a method for insulating a structure according to an embodiment of the present invention.

FIG. 5 illustrates a method 500 for insulating a structure. At block 510, a frame is provided. The frame may include a plurality of frame members coupled together. At block 520, one or more sheathing panels may be coupled to the frame members. The sheathing panels may be coupled so that adjacent sheathing panels abut and directly contact each other at an interface or seam. The coupled sheathing panels may form a wall having a front surface and a rear surface.

At block 530, a spray insulation material may be applied (e.g., sprayed) to an exterior surface of the wall. The spray insulation material may be a foam insulation material, such as those described herein. The spray insulation material may form a substantially continuous insulation layer atop the front surface. The continuous insulation layer may have a layer thickness of at least 2 inches. The spray insulation material may be applied so that the spray insulation material directly contacts the interface or seams between adjacent sheathing panels to restrict passage of air between the adjacent panels to at or below a defined industry standard (e.g., ABBA standard), which may be approximately 0.2 L/m2/s at a differential pressure across the wall of 75 Pa. The continuous insulation layer may provide an R value of at least 10.

The spray insulation material may restrict or prevent passage of air through the interface or seams. The sheathing panels may abut one or more features of the structure at an additional interface or seam, such as a pipe, an edge of the building, a window, an aperture, a vent, a roof, and the like. The spray insulation material may be applied atop the additional interface or seam such that the insulation material directly contacts the additional interface or seam to restrict passage of air therethrough. The spray insulation material may penetrate a distance into the interface or seams or may penetrate through the interface or seams to seal the interface or seams.

The spray insulation material may have adhesion promoters that enhance the ability to adhere to multiple substrates. The sheathing panels may include a fiberglass mat gypsum panel (e.g., DensGlass Flashing®), an oriented strand board, and the like. The insulation layer may be capable of providing an R value of at least 10 and an air passage restriction rate of 0.2 L/m2/s at a differential pressure across the wall of 75 Pa or less after exposure to repeated cycles of hot and cold temperature and/or repeated cycles of varying differential pressure across the wall. The spray insulation material may include a zero ozone depletion potential blowing agent. In some embodiments, the method may also include preparing the front surface prior to applying the spray insulation material to remove debris, oil, machine oil, dust, grease, excess mortar, oxidation, mill scale, and the like. The front surface may be prepared by brushing, scrubbing, scraping, grinding, wiping with solvent, and the like to remove unwanted material, contaminants, and/or debris.

FIG. 6 illustrates a method for providing an insulating air barrier to one or more structures penetrating through a building's wall, such as vents, pipes, roof edges, and the like. At block 610, a plurality of sheathing panels is provided. At block 620, one or more of the sheathing panels are coupled with a frame so that adjacent sheathing panels form a wall of the structure having an exterior surface and an interior surface. One or more structures penetrate through the wall so that an interface or seam exists between the wall and the structure penetrating through the wall. At block 630, a spray insulation material is applied to the exterior surface of the wall so that the insulation material forms an insulation layer atop the exterior surface and so that the insulation material directly contacts at least one interface/seam to restrict air flow through the interface/seam (i.e., between the wall and the structure penetrating therethrough). The applied insulation material provides a thermal resistance R value of at least 10.

Examples

A test wall having a frame and sheathing panels similar to those illustrated in FIGS. 1 and 3 was constructed and a spray foam insulating material, JM Corbond III, applied directly to an exterior surface and seams in a manner similar to that described herein. The seams in the wall between adjacent sheathing panels and/or other features had gaps or voids of up to about ⅜ to ½ inch. The spray foam insulating material was applied at a layer thickness of approximately 2 inches, which was applied in 1 pass. The test wall and continuous insulation layer were subjected to repeated test in conformance with ASTM E 2357, ASTM E 2178, and/or modified CAN/UL S711.1. The continuous insulation layer met or exceeded the air barrier standards defined by the Air Barrier Association of America (ABAA) section 07263.

I. Wind Pressure Testing

The test wall was wind pressure tested in accordance with industry standard ASTM 2357. The wind pressure testing involved sustained air pressure loads, cyclical air pressure loads, and gust wind loads. Sustained load testing involved providing both a positive differential pressure (i.e., a higher pressure applied to an interior face of the test wall) and a negative differential pressure (i.e., a higher pressure applied to an exterior face of the test wall). The exfiltration air flow, or the air flow through the wall from the interior face to the exterior face, was measured during the positive differential pressure test. The infiltration air flow, or the air flow through the wall from the exterior face to the interior face, was measured during the negative differential pressure test.

During the positive differential pressure test, the interior face of the test wall was subject to increasing pressure in increasing stages for a minimum period of 10 seconds at each stage, up to a maximum pressure of 600 Pa (i.e., the differential pressure across the wall was 600 Pa). This pressure (i.e., 600 Pa) was maintained for 1 hour. During the negative differential pressure test, the exterior face of the test wall was subject to increasing pressure in increasing stages for a maximum period of 10 second at each stage, up to a maximum pressure of 600 Pa (i.e. the differential pressure across the wall was −600 Pa). This pressure (i.e., 600 Pa) was likewise maintained for 1 hour.

Cyclical load testing involved subjecting the test wall to repeated positive differential pressure and negative differential pressure. The test wall was subject to approximately 2,000 cycles of pressure loading. The first 1000 cycles involved loading the test wall with a positive differential pressure from about 0 to about 800 Pa. The next 1000 cycles involved loading the test wall with a negative differential pressure from about 0 to about −800 Pa. The pressure loading may cause the test wall to bow and flex similar to bowing and flexing that may occur in real world applications.

Gust wind testing involved subjecting the test wall to gust wind pressure of 1200 Pa followed by a gust wind pressure of −1200 Pa. These pressures were held for a minimum of 3 seconds and deformation measurements were taken after each gust pressure.

The tables below illustrate the results of subjecting a test wall to the wind pressure conditions described above. Table 1 below illustrates test results obtained for a test wall having flashing tape applied to the seams and interfaces between sheathing panels and wall penetrations. The penetrations may be common building features penetrating through the wall, such as vents, pipes, apertures, windows and the like, which create air leakage points.

TABLE 1

Data of air leakage rate for a wall assembly with penetrations and priming/taping.

| | Leakage Rate ($L/m^2/s$) at 75 Pa | |
|---|---|---|
| | Exfiltration Air Flow | Infiltration Air Flow |
| Before Structural Loading | 0.0049 | 0.0012 |
| After Structural Loading | 0.0182 | 0.0186 |

Table 2 below illustrates test results obtained for a test wall where the spray insulation material was applied directly to the seams and interfaces between sheathing panels and wall penetrations.

TABLE 2

Data for air leakage rate for a wall assembly with penetrations and without priming/taping.

| | Leakage Rate ($L/m^2/s$) at 75 Pa | |
|---|---|---|
| | Exfiltration Air Flow | Infiltration Air Flow |
| Before Structural Loading | 0.0025 | 0.0040 |
| After Structural Loading | 0.0028 | 0.0039 |

As shown in a comparison of Table 1 and Table 2, the application of the spray foam insulation material directly to the exterior wall surface and directly to the seams or interfaces of the sheathing panels and/or penetrations provided a surprisingly superior air leakage performance for both exfiltration and infiltration air flows. The wall assembly was analyzed and the leakage was found to be due to the additional failure points resulting from the use of flashing tapes and/or primers. Similar failures may likewise be attributed to incorrect or insufficient application of the flashing tape and/or primer. This decreased performance may be common when flashing tape and/or primer is applied to features (e.g., vents, pipes, apertures, and the like) penetrating through the wall or applied adjacent such features. Table 2 also provides that the tested surfaces having spray foam insulation directly applied to the exterior surface met or exceeded industry air barrier standards as defined by ASTM E 2357—i.e., the tested wall had an air leakage rate of less than 0.2 L/m2/s at a differential pressure across the wall of approximately 75 Pascal (Pa).

II. Thermal Load Testing

The test wall corresponding to Table 2 (i.e., the test wall where the spray insulation material was applied directly to the seams and interfaces) was also subject to repeated cycles of thermal loading (i.e., hot and cold temperatures) subsequent to the gust wind testing. The thermal load test was performed following a modified thermal conditioning cycle using CAN/ULC-S711.1-05, A6.2-6 as a guide. The test wall was exposed to 24 environmental cycles as outlined in Table 3 below.

TABLE 3

Thermal loading applied to the wall assembly.

| | Weather Side | |
|---|---|---|
| Interior Side | Environmental Conditioning | Duration |
| Room Side Maintained at: 24 ± 2 C., 50% ± 10% RH | Temperature 66 ± 3° C. (Temperature Hold) | 30 ± 2 Minutes |
| | Temperature Cooled to −20 ± 2° C. (Transition A) | 90 ± 2 Minutes |
| | Temperature −20 ± 2° C. (Temperature Hold) | 30 ± 2 Minutes |
| | Rapid Heating to 66 ± 3° C. (Transition B) | 30 ± 2 Minutes |

Upon completion of the environmental cycles, the extraneous and air leakage measurements were conducted again to quantify the test specimen's durability performance. The results of the thermal load test are provided in Table 4 below.

TABLE 4

Results of thermal load testing applied to wall assembly after wind gust testing.

| | Leakage Rate (L/m²/s) at 75 Pa | |
|---|---|---|
| | Exfiltration Air Flow | Infiltration Air Flow |
| Before Thermal Loading | 0.0074 | 0.0110 |
| After Thermal Loading | 0.0081 | 0.0149 |

Thermal loading of test walls causes the wall structures and penetrations to expand and contract, often at different rates and by different amounts, which stresses air barrier materials applied to the wall. Table 4 shows that after the thermal loading, the wall maintained an air leakage rate of less than 0.2 L/m2/s at a differential pressure of 75 Pa. The wall may also provide an insulation R value of 5 or greater, or in some embodiments, 10 or greater.

III. Thermal & Pressure Load Testing

The test wall corresponding to Tables 2 & 3 (i.e., the test wall where the spray insulation material was applied directly to the seams and interfaces) was then subjected to repeated cycles of both thermal and pressure loading subsequent to the thermal load testing. The test wall was exposed to 24 environmental cycles as outlined in Table 5 below.

TABLE 5

Thermal & pressure loading applied to the wall assembly.

| | Weather Side | |
|---|---|---|
| Interior Side | Environmental Conditioning | Duration |
| Room Side Maintained at: 24 ± 2 C. 50% ± 10% RH | Temperature 66 ± 3° C. (Temperature Hold) - 1000 Pa Pressure Positive | 15 ± 1 Minutes |
| | Temperature 66 ± 3° C. (Temperature Hold) - 1000 Pa Pressure Negative | 15 ± 1 Minutes |
| | Temperature Cooled to −20 ± 2° C. (Transition A) | 90 ± 2 Minutes |
| | Temperature −20 ± 2° C. (Temperature Hold) - 1000 Pa Pressure Positive | 15 ± 1 Minutes |
| | Temperature −20 ± 2° C. (Temperature Hold) - 1000 Pa Pressure Negative | 15 ± 1 Minutes |
| | Rapid Heating to 66 ± 3° C. (Transition B) | 30 ± 2 Minutes |

Upon completion of the environmental cycles (i.e., thermal and pressure loading), the air leakage measurements were conducted to quantify the test specimen's durability performance. The results are provided in Table 6 below.

TABLE 6

Results of thermal and pressure load testing applied to wall assembly after thermal load testing.

| | Leakage Rate (L/m²/s) at 75 Pa | |
|---|---|---|
| | Exfiltration Air Flow | Infiltration Air Flow |
| Before Loading | 0.0081 | 0.0149 |
| After Loading | 0.0194 | 0.0257 |

Table 6 shows that after pressure loading, thermal loading, and subsequently combined thermal and pressure loading, the test wall maintained an air leakage rate of substantially less than the ABBA standard of 0.2 L/m2/s at a differential pressure of 75 Pa. The wall may also continue to provide an insulation R value of 5 or greater, or in some embodiments, 10 or greater. Thus, after repeated usage, the continuous insulation layer described herein provides sufficient insulating and air barrier characteristics. Or, put another way, the continuous insulation layer described herein is able to meet or exceed industry insulating and air barrier standards even after prolonged use and exposure to extreme environmental conditions—i.e., the continuous insulation layer is sufficiently durable to meet or exceed the ASTM E 2357 and ABBA standards after a prolonged period of time.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and the lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof know to those skilled in the art, and so forth.

Also, the words "comprise," "comprising," "include," "including," and "includes" when used in this specification and in the following claims are intended to specify the presence of stated features, integers, components, steps, but they do not preclude the presence or addition of one or more other features, integers, components, steps, acts, or groups.

What is claimed is:

1. A method for insulating a structure, the method comprising:

providing a frame that comprises a plurality of frame members coupled together;

coupling a plurality of sheathing panels to the frame members such that each sheathing panel of the plurality of sheathing panels abuts an adjacent sheathing panel of the plurality of sheathing panels at an interface and such that the coupled sheathing panels form a wall having an interior surface that contacts the frame members and an exterior surface opposite the interior surface, wherein the interface comprises a gap or void of about ¼ inch; and applying a spray insulation material to the exterior surface of the wall such that the insulation material forms a substantially continuous insulation layer that extends continuously over and atop the exterior surface and such that the insulation material is sprayed directly atop and contacts the interface of adjacent sheathing panels of the plurality of panels to restrict passage of air between the adjacent panels to at or below 0.2 L/m²/s at a differential pressure across the wall of 75 Pa;
wherein the insulation layer provides an R value of at least 5.

2. The method of claim 1, wherein the portion of the interface comprises a gap or void of about ⅜ inch, and wherein the spray insulation material seals the gap or void to restrict passage of air therethrough.

3. The method of claim 1, wherein the insulation layer provides an R value of at least 10.

4. The method of claim 1, wherein the spray insulation material restricts passage of air through the interface.

5. The method of claim 1, wherein one or more of the sheathing panels abut a feature of the structure at an additional interface, and where in the spray insulation material is applied atop the additional interface such that the spray insulation material directly contacts the additional interface to restrict passage of air therethrough.

6. The method of claim 5, wherein the building feature comprises one or more features selected from the group consisting of:
 a pipe;
 a structural edge;
 a window;
 an aperture;
 a vent;
 a roof;
 a duct; and
 electrical wiring.

7. The method of claim 1, wherein the spray insulation material penetrates into the interface.

8. The method of claim 7, wherein the spray insulation penetrates through the interface from the exterior surface to the interior surface.

9. The method of claim 1, wherein the insulation layer seals the interface to restrict passage of air therethrough.

10. The method of claim 1, wherein the insulation layer has a layer thickness of at least 2 inches.

11. The method of claim 1, wherein the spray insulation material comprises a foam insulation material.

12. The method of claim 1, further comprising preparing the exterior surface prior to applying the spray insulation material to minimize one or more selected from the group consisting of:
 debris;
 oil;
 machine oil;
 grease;
 mortar;
 oxidation;
 mill scale; and
 dust.

13. The method of claim 1, wherein at least one of the sheathing panels comprises a fiberglass mat gypsum panel.

14. The method of claim 1, wherein at least one of the sheathing panels comprises an oriented strand board.

15. The method of claim 1, wherein at least one of the sheathing panels comprises a foam board.

16. The method of claim 1, wherein the insulation layer is capable of providing said R value and said air passage restriction after exposure to repeated cycles of hot and cold temperature.

17. The method of claim 1, wherein the spray insulation material comprises a zero ozone depletion potential blowing agent.

18. A method for insulating a structure, the method comprising:
 providing a frame that comprises a plurality of frame members coupled together;
 coupling a plurality of sheathing panels to the frame members to form a wall having an interior surface that contacts the frame members and an exterior surface opposite the interior surface, the wall having one or more structures penetrating through the wall; and
 applying a spray insulation material to the exterior surface of the wall such that the insulation material forms a substantially continuous insulation layer that extends continuously over and atop the exterior surface and such that the insulation material is sprayed directly atop and contacts an interface between the one or more structures and the wall to restrict passage of air to at or below 0.2 L/m²/s at a differential pressure across the wall of 75 Pa;
 wherein the insulation layer provides an R value of at least 5.

* * * * *